US008589682B2

(12) United States Patent
Jaber et al.

(10) Patent No.: US 8,589,682 B2
(45) Date of Patent: Nov. 19, 2013

(54) SYSTEM AND METHOD FOR SECURE PROVISIONING OF AN INFORMATION HANDLING SYSTEM

(75) Inventors: Muhammed Jaber, Austin, TX (US); Sudhir Shetty, Cedar Park, TX (US); Theodore Web, III, Austin, TX (US); John Wilson, Burnet, TX (US)

(73) Assignee: Dell Products L.P., Round Rock, TX (US)

( * ) Notice: Subject to any disclaimer, the term of this patent is extended or adjusted under 35 U.S.C. 154(b) by 614 days.

(21) Appl. No.: 12/253,838

(22) Filed: Oct. 17, 2008

(65) Prior Publication Data

US 2010/0100733 A1 Apr. 22, 2010

(51) Int. Cl.
*H04L 9/00* (2006.01)
*H04L 9/32* (2006.01)
*G06F 15/16* (2006.01)
*G06F 15/177* (2006.01)

(52) U.S. Cl.
USPC ............ 713/168; 709/220; 709/228; 709/229

(58) Field of Classification Search
USPC .......... 713/168; 726/2, 22; 709/220, 228, 229
See application file for complete search history.

(56) References Cited

U.S. PATENT DOCUMENTS

| 4,771,461 | A | * | 9/1988 | Matyas | 380/282 |
| 7,179,170 | B2 | * | 2/2007 | Martinek et al. | 463/29 |
| 7,299,354 | B2 | | 11/2007 | Khanna et al. | 713/165 |
| 7,370,111 | B2 | * | 5/2008 | Callum | 709/229 |
| 7,430,664 | B2 | * | 9/2008 | Zhu et al. | 713/168 |
| 7,581,095 | B2 | * | 8/2009 | Billhartz | 713/168 |
| 7,636,840 | B2 | * | 12/2009 | Tang | 713/150 |
| 7,735,126 | B2 | * | 6/2010 | Zhang et al. | 726/10 |
| 7,788,491 | B1 | * | 8/2010 | Dawson | 713/168 |
| 2002/0012433 | A1 | * | 1/2002 | Haverinen et al. | 380/247 |
| 2006/0075201 | A1 | * | 4/2006 | Mizutani et al. | 711/162 |
| 2006/0174018 | A1 | * | 8/2006 | Zhu et al. | 709/229 |
| 2006/0259759 | A1 | * | 11/2006 | Maino et al. | 713/151 |
| 2007/0174131 | A1 | * | 7/2007 | Mehta et al. | 705/26 |
| 2007/0266428 | A1 | * | 11/2007 | Downes et al. | 726/5 |

* cited by examiner

*Primary Examiner* — April Y Blair
*Assistant Examiner* — Shu Chun Gao
(74) *Attorney, Agent, or Firm* — Baker Botts L.L.P.

(57) ABSTRACT

Systems and methods for reducing problems and disadvantages associated with provisioning of information handling systems, including without limitation those associated with bare metal provisioning of information handling systems, are disclosed. A system may include a processor, and a memory and an access controller each communicatively coupled to the processor. The access controller may store an enterprise public key associated with an enterprise private key and a platform private key associated with the system. The access controller may be configured to: (i) authenticate communications received from a provisioning server communicatively coupled to the access controller based at least on an enterprise public certificate associated with the provisioning server and (ii) establish an asymmetrically cryptographic communications channel between the access controller and the provisioning server based at least on a platform public key associated with the platform private key, the platform private key, the enterprise public key, and the enterprise private key.

20 Claims, 2 Drawing Sheets

SYSTEM AND METHOD FOR SECURE PROVISIONING OF AN INFORMATION HANDLING SYSTEM

TECHNICAL FIELD

The present disclosure relates in general to information handling systems, and more particularly to secure provisioning of an information handling system, including without limitation secure mutual authentication for "bare metal" provisioning of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Provisioning of information handling systems has long been used in large computing networks, for example, corporate networks. "Provisioning" broadly refers to a process that may enable administrators to enforce network security policies and/or assign system resources and privileges to users of information handling systems in a computing network (e.g., employees, contractors and business partners of a particular business enterprise). Historically, provisioning has required substantial human interaction and/or intervention with individual information handling systems being provisioned. For example, in traditional provisioning approaches, a network administrator and/or end user may need to install and/or configure an operating system and numerous application programs on the information handling system in order to make the information handling system usable from a practical standpoint.

To reduce and/or eliminate the necessity of administrator and user interaction with an information handling system to be provisioned, the concept of "bare-metal" provisioning, also known as "no-touch" or "zero-touch" provisioning, has increasingly been used. "Bare-metal provisioning" generally refers to the concept of provisioning an information handling system with little or no user or administrator interaction. For example, using bare-metal provisioning, an information handling system may be ordered by an administrator or other enterprise representative and shipped to a particular location. The information handling system may then be coupled to a network (e.g., via a wired or wireless network connection). After coupling to the network, the information handling system may automatically install (e.g., from a network-attached storage system) all necessary operating systems, application programs, configurations, security privileges, etc. desired for the ultimate end use of the information handling system.

However, traditional approaches to bare-metal provisioning are not without disadvantages. Under traditional approaches, an undesired or "rogue" information handling system may be coupled to the enterprise network and may be provisioned as if it were a "legitimate" information handling system. Such a rogue information handling system could be used maliciously, for example, to jeopardize the confidentiality and integrity of sensitive data of the enterprise.

SUMMARY

In accordance with the teachings of the present disclosure, the disadvantages and problems associated with provisioning of information handling systems, including without limitation problems and disadvantages associated with bare metal provisioning of information handling systems, have been reduced or eliminated.

In accordance with an embodiment of the present disclosure, an information handling system may include a processor, a memory communicatively coupled to the processor, and an access controller communicatively coupled to the processor. The access controller may have stored thereon an enterprise public key associated with an enterprise private key and a platform private key associated with the information handling system. The access controller may be configured to authenticate communications received from a provisioning server communicatively coupled to the access controller based at least on an enterprise public certificate associated with the provisioning server. The access controller may also be configured to establish an asymmetrically cryptographic communications channel between the access controller and the provisioning server based at least on a platform public key associated with the platform private key, the platform private key, the enterprise public key, and the enterprise private key.

In accordance with another embodiment of the present disclosure, a method for secure provisioning of an information handling system may is provided. The method may include storing an enterprise public key associated with an enterprise private key and a platform private key on an access controller associated with an information handling system. The method may also include communicating a platform public key associated with the platform private key to an enterprise. The method may further include storing a program of instructions on the access controller. The program of instructions may be configured to, when executed, authenticate communications received from a provisioning server communicatively coupled to the access controller based at least on an enterprise public certificate associated with the provisioning server. The program of instructions may also be configured to, when executed, establish an asymmetrically cryptographic communications channel between the access controller and the provisioning server based at least on the platform public key, the platform private key, the enterprise public key, and the enterprise private key.

In accordance with a further embodiment of the present disclosure, another method for secure provisioning of an information handling system, may be provided. The method may include providing a supplier of an information handling system with an enterprise public key associated with an enterprise private key. The method may also include receiving from the supplier a platform public key associated with a platform private key. The method may further include storing the enterprise public key and the platform public key on computer-readable media associated with a provisioning server. The method may additionally include storing a program of instructions on the computer-readable media associated with the provisioning server. The program of instructions may be configured to, when executed, authenticate communications received from an access controller associated with the information handling system and communicatively coupled to the provisioning server based at least on a platform public certificate associated with the information handling system. The program of instructions may also be configured to, when executed, establish an asymmetrically cryptographic communications channel between the provisioning server and the access controller based at least on the platform public key, the platform private key, the enterprise public key, and the enterprise private key.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
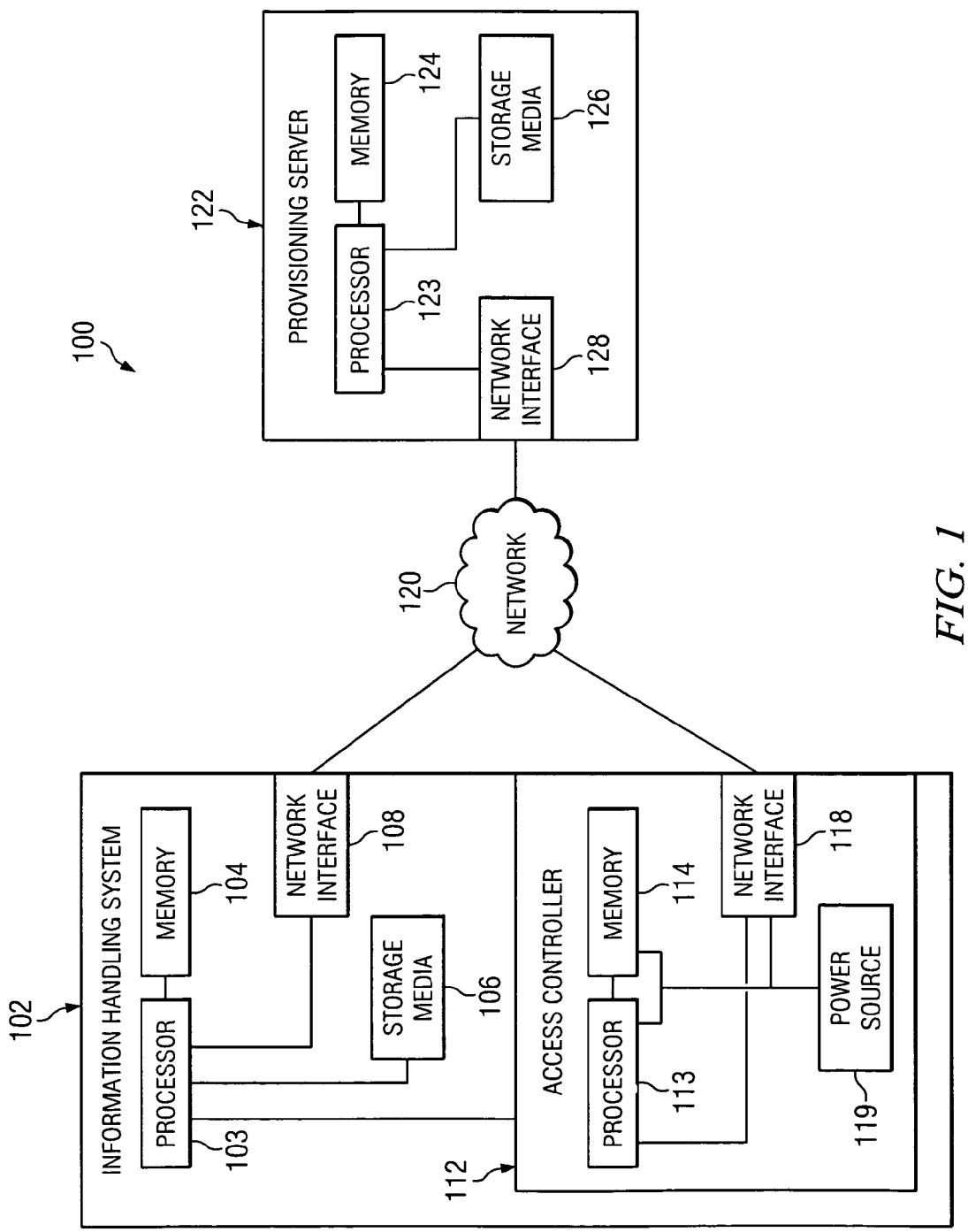
FIG. 1 illustrates a block diagram of an example system for secure provisioning of an information handling system, in accordance with certain embodiments of the present disclosure.
Figure 2:
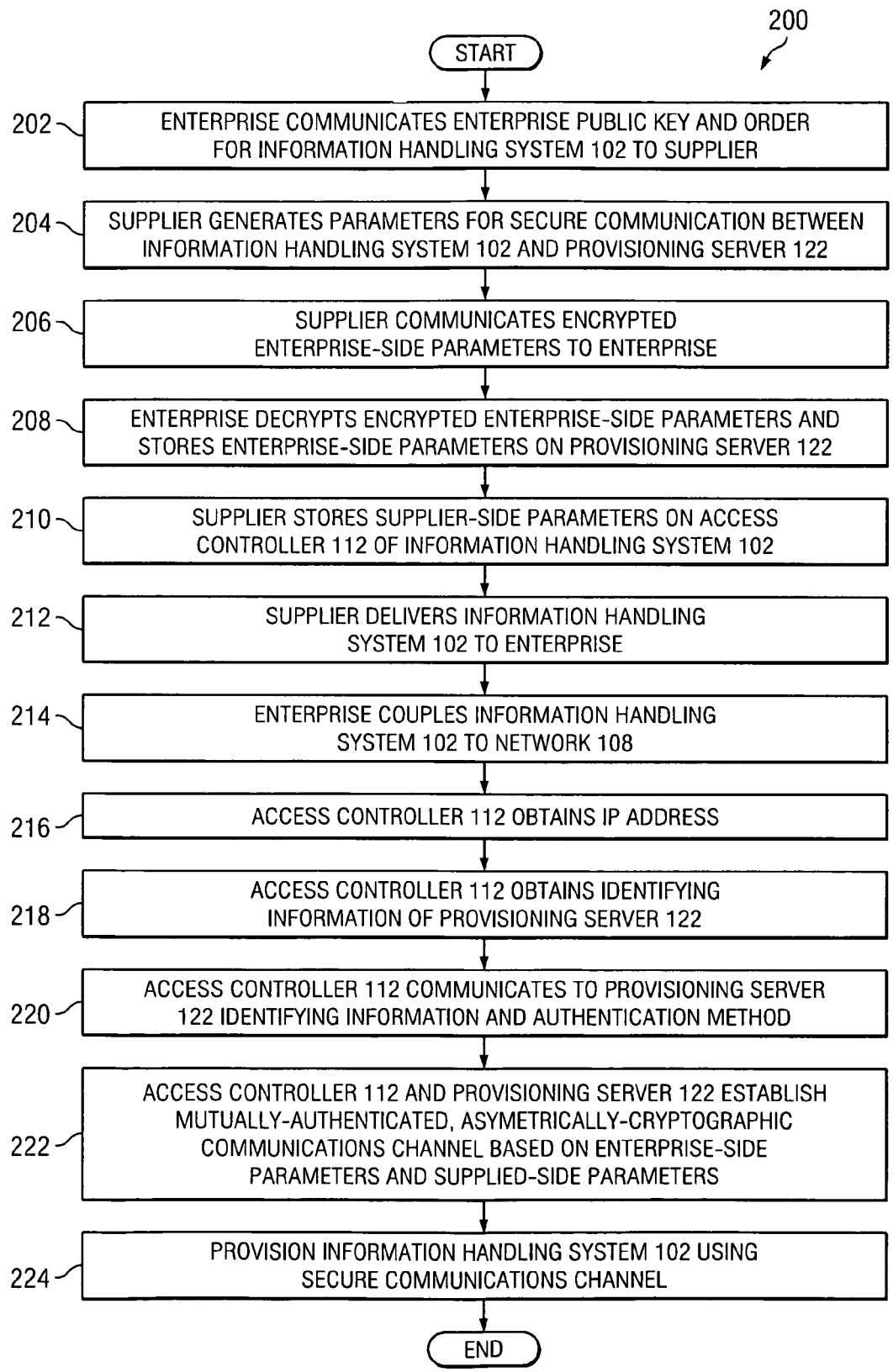
FIG. 2 illustrates a flow chart of an example method for secure provisioning of an information handling system, in accordance with certain embodiments of the present disclosure.

Preferred embodiments and their advantages are best understood by reference to FIGS. 1-2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 for secure provisioning of an information handling system 102, in accordance with certain embodiments of the present disclosure. As depicted in FIG. 1, system 100 may include an information handling system 102, a network 120, and a provisioning server 122.

Information handling system 102 may generally be operable to receive data from and/or communicate data to one or more other information handling systems via network 120. In certain embodiments, information handling system 102 may be a server. In another embodiment, information handling system 102 may be a personal computer (e.g., a desktop computer or a portable computer). As depicted in FIG. 1, information handling system 102 may include a processor 103, a memory 104 communicatively coupled to processor 103, storage media 106 communicatively coupled to processor 103, a network interface 108 communicatively coupled to processor 103, and an access controller 112 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage media 106 and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Storage media 106 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

Network interface 108 may include any suitable system, apparatus, or device operable to serve as an interface between information handling system 102 and network 120. Network interface 108 may enable information handling system 102 to communicate over network 120 using any suitable transmission protocol and/or standard, including without limitation all transmission protocols and/or standards enumerated below with respect to the discussion of network 120. In certain embodiments, network interface 108 may be configured with hardware, software, and/or firmware to allow its associated information handling system 102 to remotely boot from a computer-readable medium remote from information handling system 102 (e.g., a computer-readable medium coupled to network interface 108 via network 120).

Access controller 112 may be any system, device, or apparatus configured to permit an administrator or other person to remotely monitor and/or remotely manage information handling system 102 (e.g., via an information handling system remotely connected to information handling system 102 via network 120) regardless of whether information handling system 102 is powered on and/or has an operating system installed thereon. In certain embodiments, access controller 112 may allow for "out-of-band" control of information handling system 102, such that communications to and from access controller 112 are communicated via a management channel physically isolated from the "in band" communication with network interface 108. Thus, for example, if a failure occurs in information handling system 102 that prevents an administrator from remotely accessing information handling system 102 via network interface 108 (e.g., operating system failure, power failure, etc.), the administrator may still be able to monitor and/or manage the information handling system 102 (e.g., to diagnose problems that may have caused failure) via access controller 112. In the same or alternative embodiments, access controller 112 may allow an administrator to remotely manage one or parameters associated with operation of information handling system 102 (e.g., power usage, processor allocation, memory allocation, security privileges, etc.). In certain embodiments, access controller 112 may include or may be an integral part of a Dell Remote Access Controller (DRAC) or an Integrated Dell Remote Access Controller (iDRAC).

As depicted in FIG. 1, access controller 112 may include a processor 113, a memory 114 communicatively coupled to processor 113, a network interface 118 communicatively coupled to processor 113, and a power source 119 electrically coupled to processor 113.

Processor 113 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102.

Memory 114 may be communicatively coupled to processor 113 and may include any system, device, or apparatus configured to retain program instructions and/or data for a period of time (e.g., computer-readable media). Memory 114 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In certain embodiments, memory 114 may store firmware that includes executable instructions to govern operation of access controller 112.

Network interface 118 may include any suitable system, apparatus, or device operable to serve as an interface between access controller 112 and network 120. Network interface 118 may enable access controller 102 to communicate over network 120 using any suitable transmission protocol and/or standard, including without limitation all transmission protocols and/or standards enumerated below with respect to the discussion of network 120.

Power source 119 may include any system, device, or apparatus configured to and provide electrical energy to one or more components of access controller 112. In certain embodiments, power source 119 may include an alternating current (AC) or direct current (DC) source wherein electrical energy is provided from an electrical outlet (e.g., a 120-volt wall outlet). In certain embodiments, power source 119 may include a battery that stores electrochemical energy and provides electrical energy to one or more components of access controller 112. For example, power source 119 may be a rechargeable battery, meaning that its electrochemical energy may be restored by the application of electrical energy (e.g., a lead and sulfuric acid battery, nickel cadmium (NiCd) battery, nickel metal hydride (NiMH) battery, lithium ion (Li-ion) battery, lithium ion polymer (Li-ion polymer) battery, or any combination of the foregoing, or any other suitable battery). In operation, power source 119 may provide electrical energy to one or more electrical or electronic components (e.g., processor 113, memory 114, network interface 118) supplemental to or in lieu of a "main" power source of information handling system 102 (e.g., electrical power provided via an electrical outlet or a main system battery of information handling system 102).

Network 120 may be a network and/or fabric configured to communicatively couple information handling system 102, access controller 112, provisioning server 122, other information handling systems, and/or other networked components to each other. Network 120 may include a communication infrastructure, which provides physical connections, and a management layer, which organizes the physical connections, information handling system 102, access controller 112, and provisioning server 122. In the same or alternative embodiments, network 120 may allow block I/O services and/or file access services to network-attached computer-readable media.

Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Provisioning server 122 may comprise an information handling system and may generally be operable to receive data from and/or communicate data to one or more other information handling systems via network 120. In certain embodiments, provisioning server 122 may be configured to communicate data and/or instructions to information handling system 102 in order to facilitate bare-metal provisioning of information handling system 102, as described in greater detail with respect to FIG. 2. As depicted in FIG. 1, provisioning server may include a processor 123, a memory 124 communicatively coupled to processor 123, storage media 126 communicatively coupled to processor 123, and a network interface 128 communicatively coupled to processor 123.

Processor 123 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124, storage media 126 and/or another component of provisioning server 122.

Memory 124 may be communicatively coupled to processor 123 and may include any system, device, or apparatus configured to retain program instructions and/or data for a period of time (e.g., computer-readable media). Memory 124 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to provisioning server 122 is turned off.

Storage media 126 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

Network interface 128 may include any suitable system, apparatus, or device operable to serve as an interface between provisioning server 122 and network 120. Network interface 128 may enable provisioning server to communicate over network 120 using any suitable transmission protocol and/or standard, including without limitation all transmission protocols and/or standards enumerated above with respect to the discussion of network 120. In certain embodiments, network interface 128 may be configured with hardware, software, and/or firmware to allow its associated provisioning server 122 to remotely boot from a computer-readable medium remote from information handling system 102 (e.g., a computer-readable medium coupled to network interface 108 via network 120).

FIG. 2 illustrates a flow chart of an example method 200 for secure provisioning of information handling system 102, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps 202-224 comprising method 200 may depend on the implementation chosen.

For the purposes of this disclosure, the term "enterprise" may broadly refer to a business, corporation, organization, association, or any other type of person or entity that may own and/or control one or more information handling systems communicatively coupled to each other via a network. In addition, the term "supplier" may broadly refer to any manufacturer, seller, reseller, wholesaler, retailer, lessor, distributor, and/or other supplier of information handling system 102.

At step 202, an enterprise (e.g., via an administrator or other representative of the enterprise) may communicate an enterprise public certificate and an order for information handling system 102 to a supplier. The order may be communicated in any suitable manner. For example, the order may be communicated via the world wide web and/or another suitable computing network. Alternatively, the order may be placed via telephone, mail, courier or other suitable communication means.

The communicated enterprise public certificate may include a digital signature and/or an enterprise public key in order to identify and/or associate the enterprise public key with the enterprise in accordance with any suitable public-key cryptography standard (e.g., transport layer security, secure socket layer, pre-shared key, public key infrastructure, Diffie-Hellman key exchange, etc.). The enterprise public key may be any encryption key such that a message encrypted with the enterprise public key may be decrypted with a corresponding enterprise private key.

The order communicated by the enterprise may include a plurality of parameters related to the ordered information handling system 102, network 120, and/or provisioning server 122. For example, the order may include information regarding identifying information (e.g., Internet Protocol address) of the enterprise's dynamic host configuration protocol (DHCP) server, identifying information to be assigned to information handling system 102 (e.g., Internet Protocol address, global unique identifier, etc.), and/or identifying information (e.g., Internet Protocol address) of provisioning server 122.

At step 204, the supplier may generate parameters for secure communication between information handling system 102 and provisioning server 122. For example, the supplier may generate a platform public certificate, a platform public key and corresponding platform private key for information handling system 102, such that a message encrypted with the platform public key may be decrypted with the platform private key. In addition, the supplier may also generate identifying information to be assigned to information handling system 102 (e.g., Internet Protocol address, global unique identifier, etc.) in lieu of or in addition to any such identifying information communicated by the enterprise at step 202 above. The supplier may generate such parameters in any suitable manner. For example, the platform public certificate, platform public key, and platform private key may be generated automatically by an information handling system maintained by the supplier.

At step 206, the supplier may encrypt enterprise-side parameters with the enterprise public key and communicate the encrypted enterprise-side parameters to the enterprise. The enterprise-side parameters may include a plurality of parameters regarding information handling system 102 that may allow provisioning server 122 to authenticate communications received from information handling system 102. For example, enterprise-side parameters may include identifying information regarding information handling system 102 (e.g., Internet Protocol address, global unique identifier, etc.) and/or the platform public certificate (including the platform public key).

At step 208, the enterprise may decrypt the enterprise-side parameters using the enterprise private key, and store the enterprise-side parameters on provisioning server 122 (e.g., on storage media 128).

At step 210, the supplier may store platform-side parameters on access controller 112 (e.g., in memory 114) or information handling system 102. Platform-side parameters may include a plurality of parameters regarding provisioning server 122, the enterprise, and information handling system 102 that may allow information handling system 102 to authenticate communications received from provisioning server 122. For example, platform-side parameters may include identifying information regarding information handling system 102 (e.g., Internet Protocol address, global unique identifier, etc.), the platform public certificate (including platform public key), the platform private key, the enterprise public certificate (including platform public key), identifying information regarding provisioning server 122 (e.g., Internet Protocol address, etc.), and/or identifying information regarding the enterprise's DHCP server (e.g., Internet Protocol address, etc.).

At step 212, the supplier may deliver information handling system 102 to the enterprise (e.g., by shipping information handling system 102).

At step 214, the enterprise may couple information handling system to network 108 (e.g., via wireless or wired connection).

At step 216, access controller 112 may obtain an Internet Protocol (IP) address to be assigned to information handling system 102. For example, access controller 112 may obtain the IP address by broadcasting a request via network 108 in accordance with Dynamic Host Configuration Protocol (DHCP) and receiving a response to the broadcast. In certain embodiments in which an IP address has been pre-assigned to information handling system 102 (e.g., by the enterprise at step 202), step 216 may be eliminated.

At step 218, access controller 112 may obtain identifying information (e.g., host name, IP address, etc.) of provisioning server 122, in order to allow access controller 112 to communicate with provisioning server 122. For example, access controller 112 may broadcast a request for the identifying information of provisioning server 122 and provisioning server 122 or another component of system 100 may respond to the request by communicating the appropriate identifying information to access controller 112.

At step 220, access controller 112 may communicate to provision server 122 identifying information for information handling system 102 (e.g., global unique identifier, IP address, etc.) and an authentication method supported by access controller 112.

At step 222, access controller 112 and provisioning server 122 may establish a mutually-authenticated, asymmetrically cryptographic communications channel based on enterprise-side parameters and supplier-side parameters. For example, based on the information handling system 102 identifying information communicated at step 220, and the enterprise-side parameters (e.g., identifying information and/or platform public certificate) communicated at step 206, provisioning server 122 may authenticate that communications received from information handling system 102 are indeed originating from information handling system 102. Similarly, based on platform-side parameters (e.g., enterprise public certificate) stored on access controller 112 at step 210, access controller 112 may authenticate that communications received from provisioning server 122 are indeed originating from provisioning server 122. Thus, communications are mutually authenticated.

In addition, communications between access controller 112 and provisioning server may be communicated using asymmetric cryptography. For example, provisioning server 122 may encrypt communications intended for access controller 112 using the platform public key, and access controller 112 may decrypt the communications using the platform private key. Similarly, access controller 112 may encrypt communications intended for provisioning server 122 using the enterprise public key, and provisioning server may decrypt the communications using the enterprise private key.

At step 224, information handling system 102 may be provisioned via the secure communication channel establish during step 222. For example, using the secure communications channel, information handling system 102 may obtain configuration parameters from provisioning server 122 regarding the configuration of the hardware and/or software components (e.g., operating systems and/or application programs) of information handling system 102. In addition or alternatively, information handling system 102 may download, install, and/or configure operating systems and/or application programs from provisioning server 122 and/or from storage media communicatively coupled to information handling system 102.

In certain embodiments, provisioning server 122 and/or another component of system 100 may, after establishment of the secure communications channel at step 222, generate permanent cryptographic credentials (e.g., public certificates and/or private-public key pairs maintained by the enterprise) for establishing a second secure communications channel. This second secure communications channel may also be asymmetrically cryptographic. The second secure communication channel may be utilized in situations in which an enterprise desires additional security over and above that discussed above. For example, the enterprise may have its own unique certificates, key pairs, and/or other credentials that it desires to maintain as confidential, and may use such credentials to ensure an additional level of security. Accordingly, in such embodiments, information handling system 102 and provisioning server 122 may use the permanent cryptographic credentials to establish a second secure communications channel, and provisioning may take place over the second secure communications channel.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order. For example, in some embodiments, step 208 may be performed before, after, or substantially contemporaneous to step 210.

Method 200 may be implemented using system 100 or any other system operable to implement method 200. In certain embodiments, method 200 may be implemented partially or fully in software and/or firmware embodied in computer-readable media.

Using the methods and systems disclosed herein, problems associated with conventional approaches to simultaneous secure provisioning of an information handling system may be improved, reduced, or eliminated. For example, the methods and systems disclosed herein provide a method of allowing an enterprise to verify the authenticity of a to-be-provisioned information handling system introduced into the enterprise network while also allowing the to-be-provisioned information handling system to verify the authenticity of the enterprise network to which is it coupled. Accordingly, bare-metal provisioning may be facilitated whereby many of the security concerns associated with traditional approaches are reduced and/or eliminated.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
   a processor;
   a memory communicatively coupled to the processor; and
   an access controller communicatively coupled to the processor, the access controller having stored thereon an enterprise public key associated with an enterprise private key and a platform private key associated with the information handling system, the enterprise public key stored on the access controller prior to shipment of the information handling system to an enterprise associated with the enterprise public key, the access controller configured to:

authenticate communications received from a provisioning server communicatively coupled to the access controller based at least on an enterprise public certificate associated with the provisioning server;

establish an asymmetrically cryptographic communications channel between the access controller and the provisioning server based on keys, comprising a platform public key associated with the platform private key, the platform private key, the enterprise public key, and the enterprise private key, the platform public key encrypted using the enterprise public key and provided to the enterprise by a supplier; and enable the information handling system to receive provisioning information from the provisioning server via the established communications channel, the provisioning information used to configure the information handling system.

2. An information handling system according to claim 1, the access controller further configured to encrypt communications to the provisioning server using the enterprise public key.

3. An information handling system according to claim 1, the access controller further configured to decrypt communications from the provisioning server using the platform private key.

4. An information handling system according to claim 1, the access controller further configured to provision the information handling system via communications received via the asymmetrically cryptographic communications channel.

5. An information handling system according to claim 1, the access controller further configured to establish a second asymmetrically cryptographic communications channel between the access controller and the provisioning server based at least on enterprise-provided credentials other than the enterprise public key and the enterprise private key.

6. An information handling system according to claim 5, the access controller further configured to provision the information handling system via communications received via the second asymmetrically cryptographic communications channel.

7. An information handling system according to claim 1, wherein the enterprise public key is communicated to the supplier by an enterprise.

8. A non-transitory computer-readable medium, comprising instructions that, when executed by a processor, are configured to:

store an enterprise public key associated with an enterprise private key and a platform private key on an access controller associated with an information handling system, the enterprise public key stored on the access controller prior to shipment of the information handling system to an enterprise associated with the enterprise public key by a supplier;

communicate a platform public key associated with the platform private key from a supplier to the enterprise, the platform public key encrypted by the supplier using the enterprise public key; and store a program of other instructions on the access controller, the program of other instructions configured to, when executed:

authenticate communications received from a provisioning server communicatively coupled to the access controller based at least on an enterprise public certificate associated with the provisioning server;

establish an asymmetrically cryptographic communications channel between the access controller and the provisioning server based on keys, comprising the platform public key, the platform private key, the enterprise public key, and the enterprise private key; and enable the information handling system to receive provisioning information from the provisioning server via the established communications channel, the provisioning information used to configure the information handling system.

9. The non-transitory computer readable medium of claim 8, the program of other instructions further configured to encrypt communications to the provisioning server using the enterprise public key.

10. The non-transitory computer readable medium of claim 8, the program of other instructions further configured to decrypt communications from the provisioning server using the platform private key.

11. The non-transitory computer readable medium of claim 8, the program of other instructions further configured to provision the information handling system via communications received via the asymmetrically cryptographic communications channel.

12. The non-transitory computer readable medium of claim 8, the program of other instructions further configured to establish a second asymmetrically cryptographic communications channel between the access controller and the provisioning server based at least on enterprise-provided credentials other than the enterprise public key and the enterprise private key.

13. The non-transitory computer readable medium of claim 12, the program of other instructions further configured to provision the information handling system via communications received via the second asymmetrically cryptographic communications channel.

14. The non-transitory computer readable medium of claim 8, the program of other instructions further configured to receive the enterprise public key from the enterprise.

15. A method for secure provisioning of an information handling system, comprising:

providing a supplier of an information handling system with an enterprise public key associated with an enterprise private key;

receiving from the supplier a platform public key associated with a platform private key, the platform public key encrypted using the enterprise public key;

storing the enterprise public key and the platform public key on computer-readable media associated with a provisioning server; and authenticating communications received from an access controller associated with the information handling system and communicatively coupled to the provisioning server based at least on a platform public certificate associated with the information handling system;

establishing an asymmetrically cryptographic communications channel between the provisioning server and the access controller based on keys, comprising the platform public key, the platform private key, the enterprise public key, and the enterprise private key, the enterprise public key stored on the access controller prior to shipment of the information handling system to an enterprise; and enabling the information handling system to receive provisioning information from the provisioning server via the established communications channel, the provisioning information used to configure the information handling system.

16. A method according to claim 15, further comprising encrypting communications to the information handling system using the enterprise public key.

17. A method according to claim 15, further comprising decrypting communications from the information handling system using the platform private key.

18. A method according to claim 15,
further comprising provisioning the information handling system via communications received via the asymmetrically cryptographic communications channel.

19. A method according to claim 15, further comprising:
generating credentials other than the enterprise public key and the enterprise private key; and
establishing a second asymmetrically cryptographic communications channel between the access controller and the provisioning server based at least on the enterprise provided credentials.

20. A method according to claim 19,
further comprising provisioning the information handling system via communications received via the second asymmetrically cryptographic communications channel.

* * * * *